United States Patent [19]

Mineo et al.

[11] Patent Number: 5,660,467
[45] Date of Patent: Aug. 26, 1997

[54] RAW MATERIAL MIXING METHOD AND APPARATUS

[75] Inventors: Kazuyuki Mineo; Koichi Kano, both of Hiratsuka, Japan

[73] Assignee: The Yokohama Rubber Co., Ltd., Tokyo, Japan

[21] Appl. No.: 552,781

[22] Filed: Nov. 3, 1995

[30] Foreign Application Priority Data

Nov. 18, 1994 [JP] Japan .................................. 6-284958
Jun. 8, 1995 [JP] Japan .................................. 7-141574

[51] Int. Cl.$^6$ .................................................. B01F 7/00
[52] U.S. Cl. ........................ 366/279; 366/241; 366/348; 366/349
[58] Field of Search .......................... 366/601, 142, 366/241, 251, 252, 279, 282, 283, 349; 318/811

[56] References Cited

U.S. PATENT DOCUMENTS

| | | | |
|---|---|---|---|
| 3,548,280 | 12/1970 | Cockroft | 366/601 |
| 4,747,690 | 5/1988 | Hayashi | 366/142 |
| 5,347,205 | 9/1994 | Piland | 366/601 |

FOREIGN PATENT DOCUMENTS

| | | | |
|---|---|---|---|
| 45454 | 10/1985 | Japan | 366/601 |
| 201798 | 8/1989 | Japan | 366/601 |

*Primary Examiner*—Tony G. Soohoo
*Attorney, Agent, or Firm*—Finnegan, Henderson, Farabow, Garrett & Dunner

[57] ABSTRACT

A batch type raw material mixing method and apparatus for obtaining a viscous material from a plurality of kinds of raw materials of different properties, in which the materials are placed in a cylindrical container and agitated by agitating blades, the rotational speed of which is switched cyclically between a high level and a low level. The apparatus comprises a cylindrical container for holding the raw materials therein, agitating blades provided rotatably in the cylindrical container, a driving device for rotating the agitating blades, and a control unit for controlling the cyclic switching of the rotational speed of the agitating blades between a high level and a low level.

23 Claims, 7 Drawing Sheets

RAW MATERIAL MIXING METHOD AND APPARATUS

BACKGROUND OF THE INVENTION

This invention relates to a batch type raw material mixing method used to obtain a viscous material by agitate-mixing a plurality of kinds of raw materials of different properties, and an apparatus therefor, and more particularly to a batch type raw material mixing method capable of reducing the agitate-mixing time and energy consumption and thereby improving a mixing efficiency, and an apparatus therefor.

For example, in order to manufacture a viscous material, such as a bonding agent by a batch type method, a plurality of kinds of raw materials of different properties are placed in a cylindrical container, and agitate-mixed by rotating agitating blades provided in the container. Owing to this agitate-mixing operation, the raw materials react on one another, and a viscous material can be obtained.

The conventional batch type methods in which raw materials are agitate-mixed in this manner include a method in which raw materials are agitate-mixed by rotating agitating blades at a constant rotational speed for a predetermined period of time, a method in which raw materials are agitate-mixed at a predetermined rotational speed as the agitation time is changed every time the raw materials are charged into a container, and a method in which raw materials are agitate-mixed at a different rotational speed for a different period of agitation time every time the raw materials are charged into a container.

In order to obtain a mixture having an object viscosity as soon as possible, the shape, size and rotational speed of the agitating blades are determined in accordance with the properties of the materials to be processed, or baffle plates are fixed to the inner surface of the cylindrical container, whereby the agitate-mixing effect thereof is improved.

Trying to improve the agitate-mixing effect by selectively determining the shape and size of the agitating blades in accordance with the properties of raw materials to be processed may not give rise to troubles when the same viscous mixture is manufactured in every batch. However, an attempt to obtain viscous materials, the properties of which are different in different batches, in the same equipment does not ensure an expected high agitate-mixing effect.

When a cylindrical container provided with baffle plates on the inner surface thereof is used, a mixed viscous material resides on the corner portions of the baffle plates, so that the discharging of the residual viscous material and the cleaning of the interior of the container become troublesome. Furthermore, there is the possibility that a dead zone occurs in which the raw material charged into a portion in the vicinity of a baffle plate is not satisfactorily agitated to reside therein.

A method in which raw materials are agitate-mixed by rotating agitating blades forward and backward alternately so as to improve the agitate-mixing effect has also been proposed. However, in this method, a time zone in which a flow of materials being mixed is completely stopped due to the switching of forward rotation of the agitating blades to backward rotation thereof, and vice versa occurs. Therefore, the viscous materials processed are limited, and this method cannot be suitably used for the production of all kinds of mixtures. Moreover, the energy efficiency is low.

SUMMARY OF THE INVENTION

An object of the present invention is to provide a raw material mixing method capable of improving an agitate-mixing efficiency without changing the shape and size of agitating blades and irrespective of the kind of the raw materials to be processed or the properties of a viscous material to be obtained, and an apparatus therefor.

Another object of the present invention is to provide a raw material mixing method capable of improving an agitate-mixing efficiency without providing a baffle plate in an agitation container, and an apparatus therefor.

Still another object of the present invention is to provide a raw material mixing method which is capable of obtaining a high agitate-mixing effect at all times with the kind of materials to be processed and the kind of a viscous material to be obtained not limited, and which does not cause a decrease in the energy efficiency, and an apparatus therefor.

The raw material mixing method according to the present invention which achieves these objects is a batch type raw material mixing method in which a plurality of kinds of raw materials of different properties are placed in a cylindrical container, a viscous material being obtained therefrom by rotating agitating blades, characterized in that the raw materials are agitate-mixed as the rotational speed of the agitating blades is switched periodically from a high level to a low level, and vice versa.

The raw material mixing apparatus according to the present invention is a batch type raw material mixing apparatus for obtaining a viscous material by agitate-mixing a plurality of kinds of raw materials of different properties, comprising a cylindrical container in which raw materials are placed, agitating blades provided rotatably in the cylindrical container and adapted to agitate-mix the raw materials, a driving means for rotating the agitating blades, and a control unit adapted to control the periodic switching of the rotational speed of the agitating blades from a high level to a low level, and vice versa.

Since the raw materials are thus mixed as the rotational speed of the agitating blades is changed periodically from a high level to a low level, and vice versa, the agitating blades exert a pushing force on the raw materials being mixed when the rotational speed thereof is high, low, and increased from a low level to a high level, to apply an inertial force, which causes the raw materials to flow, to the same materials. While the rotational speed of the agitating blades decreases from a high level to a low level, a braking force opposing the flow of the raw materials is exerted on the raw materials being mixed. Since these forces are imparted repeatedly to the materials being mixed, the materials in the cylindrical container are put in an irregular, disordered, fluidized condition. Consequently, the collision and contacting of the materials being mixed are promoted, and a large shearing force is exerted thereon. Accordingly, the raw materials can be mixed as they are loosened effectively, and this enables the agitate-mixing efficiency to be improved.

Since the agitate-mixing efficiency is not influenced by the properties of the viscous materials to be processed, the shape and size of the agitating blades need not be changed in accordance with the properties of the materials, i.e., the agitating blades can be used suitably for all the viscous materials to be processed. Moreover, since the provision of a baffle plate is not required, the discharging of the mixed viscous materials and the cleaning of the interior of the container can be done easily. In addition, the agitating blades are rotated continuously in the same direction without being reversed, so that a decrease in the energy efficiency does not occur.

BRIEF DESCRIPTION OF THE DRAWINGS

FIGS. 5(a) and 5(b) are explanatory drawings showing a flow of the materials being mixed in a cylindrical container during an agitate-mixing operation, wherein FIG. 5a is a plan view, and FIG. 5b a front view;

FIG. 7a is a graph showing the relation between the rotational speed of the agitating blades and the time during an agitate-mixing operation, FIG. 7b a graph showing the variation of the viscosity of the materials being mixed during the same operation, and FIG. 7c a graph showing the variation of the temperature of the materials being mixed;

DESCRIPTION OF THE PREFERRED EMBODIMENTS

Figure 1:
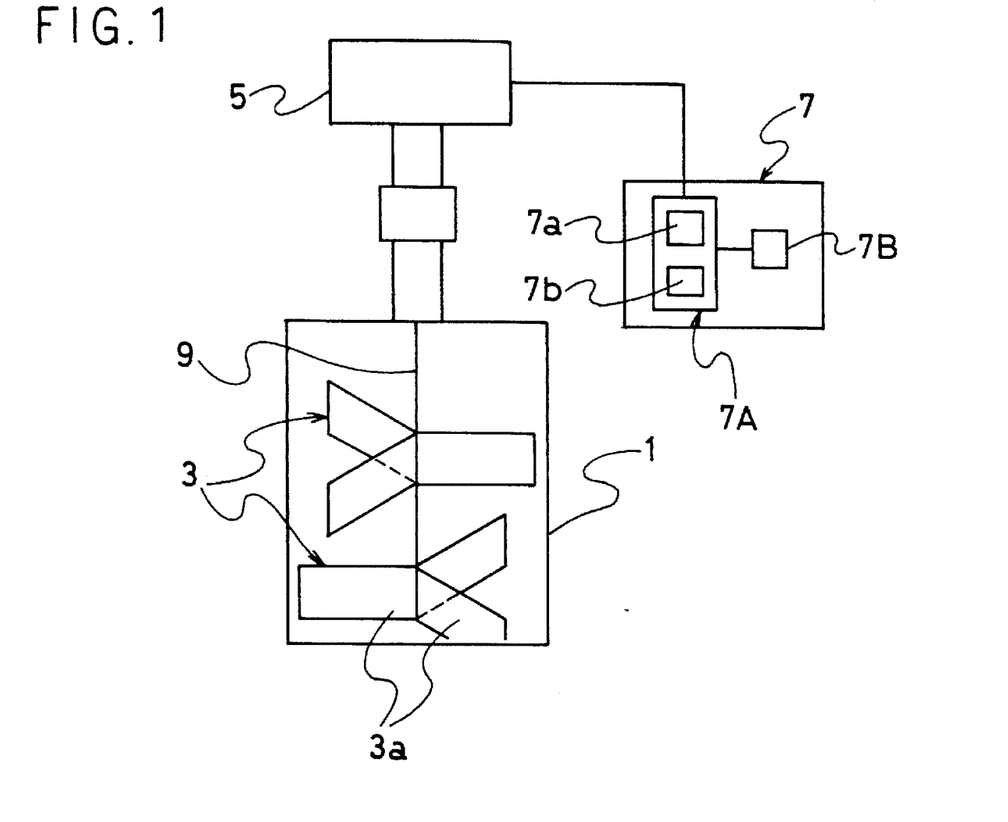
FIG. 1 is a schematic construction diagram showing an example of the raw material mixing apparatus according to the present invention.

As shown in FIG. 1, the batch type raw material mixing apparatus according to the present invention is provided with a cylindrical container 1 holding a plurality of kinds of raw materials, agitating blades 3 provided rotatably in this cylindrical container 1 and used to agitate-mix the raw materials, a driving means 5 for rotating the agitating blades 3, and a control unit 7 for controlling the periodic switching of the rotational speed of the agitating blades 3 between a high level and a low level.

The agitating blades 3 are fixed to a rotary shaft 9 rotatably suspended in the interior of the container 1, and adapted to be rotated in accordance with the rotation of the rotary shaft 9. A driving means 5 comprising a motor is connected to an upper end of the rotary shaft 9.

The control unit 7 is connected to the driving means 5, and has a controller 7A provided with a speed control means 7a for controlling the rotational speed of the driving means 5 at a high level and a low level, and a time control means 7b for controlling the durations of the high-speed operation and a low-speed operation of the driving means 5 and the cycling time of these operations. A reference numeral 7B denotes an input element adapted to input set data to the speed control means 7a and time control means 7b, which are controlled on the basis of predetermined control dada, through the controller 7A.

Figure 2:
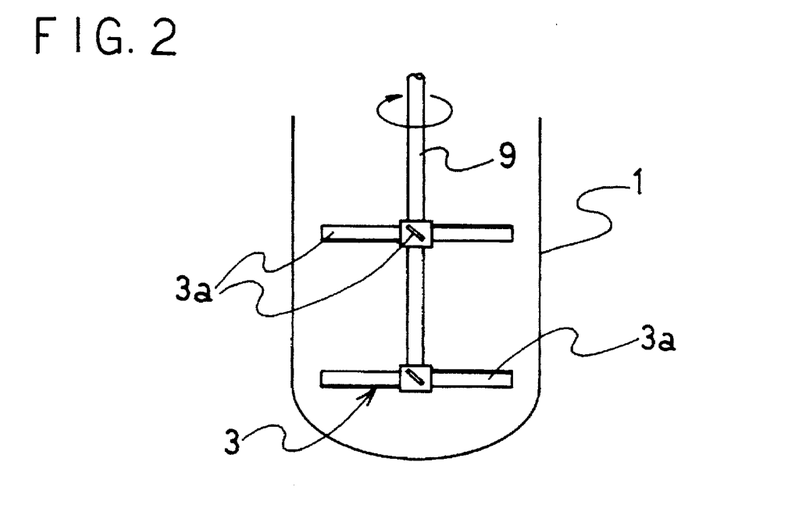
FIG. 2 is an explanatory drawing showing another example of the agitating blades.
Figure 3:
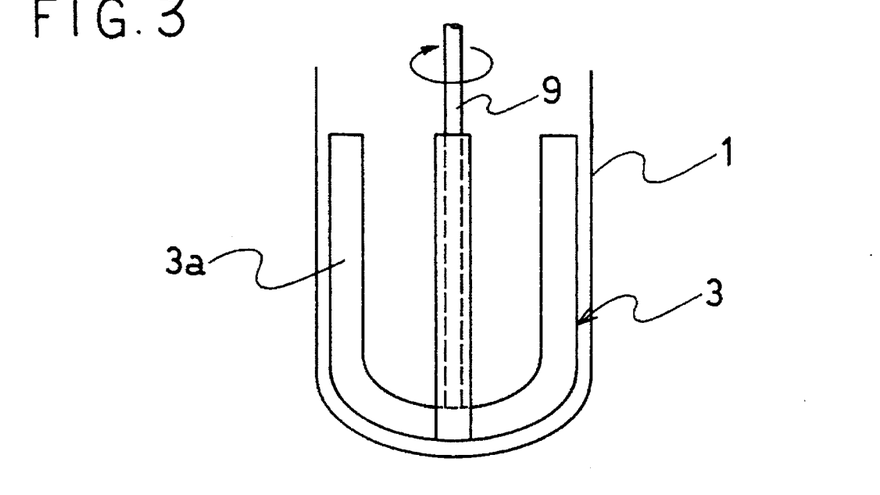
FIG. 3 is an explanatory drawing showing still another example of the agitating blades.
Figure 4:
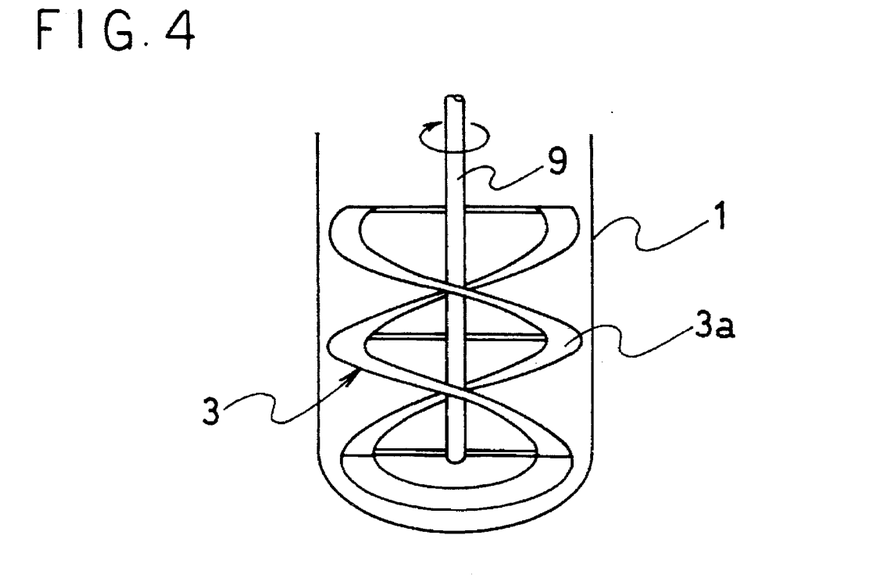
FIG. 4 is an explanatory drawing showing a further example of the agitating blades.

The agitating blades 3 shown in FIG. 1 are formed in two vertical stages in each of which three flat plate type blade members 3a are projected radially from the rotary shaft 9 so as to be spaced 120° from one another. The agitating blades formed in two vertical stages in each of which four inclined flat plate type blade members 3a are provided radially so as to be spaced 90° from one another as shown in FIG. 2, the agitating blades having U-shaped flat plate type blade members 3a joined to a lower end of a rotary shaft 9 so that the blade members cross each other as shown in FIG. 3, or the agitating blades formed by fixing a spiral flat plate type blade members 3a to a rotary shaft 9 as shown in FIG. 4 can also be used preferably.

The controlling of the rotation of the agitating blades 3 at a high level and a low level can be done by controlling the voltage frequency of a motor or the synchronization of a DC machine used as a motor. In these speed changing methods, a rotational speed can be set arbitrarily, and the duration time of increased and decreased speeds required for switching the rotational speed between a high level and a low level. Therefore, these methods can be used preferably so as to display the effect of the present invention to the maximum extent.

A pole change motor may be employed as the motor. In such a case, the stopping and starting of the motor are repeated every time the number of poles is switched, so that a starting current flows greatly. Therefore, this kind of motor can be employed when a speed change interval is long.

A mechanical speed changer may also be used which include a multistage speed changer using gears, and a nonstage speed changer using cones and discs. A nonstage speed changer has a low resistance to repeated impact force, and is not suitably used for high-viscosity materials. It can be used when a low-viscosity material is obtained.

According to the present invention, which uses the above-described batch type apparatus, a viscous material can be obtained by agitate-mixing a plurality of kinds of raw materials supplied to the interior of the container 1 while periodically switching the rotational speed of the agitating blades 3 between a high level and a low level. During this time, the temperature of the raw materials is increased to a reaction temperature by heating via the container 1, and the raw materials are cooled after the reaction has finished.

Figure 5A:
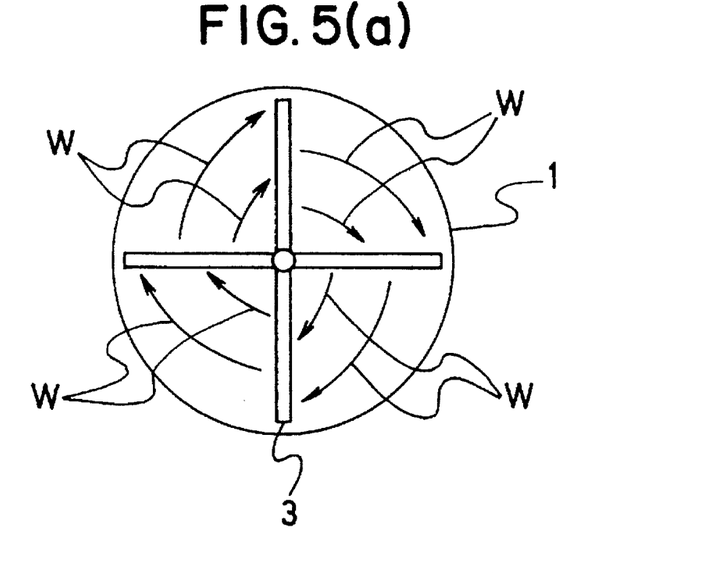
Figure 5B:
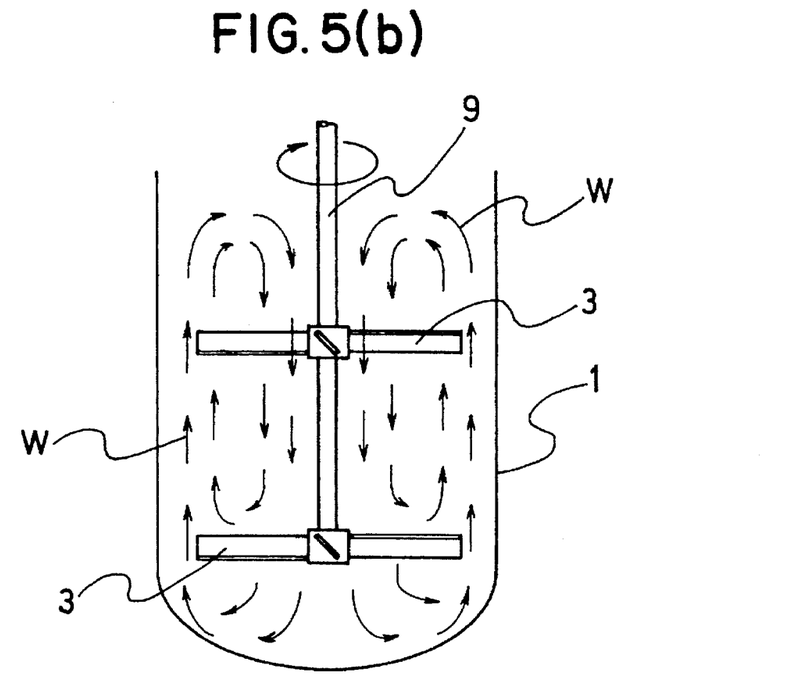
Figure 6:
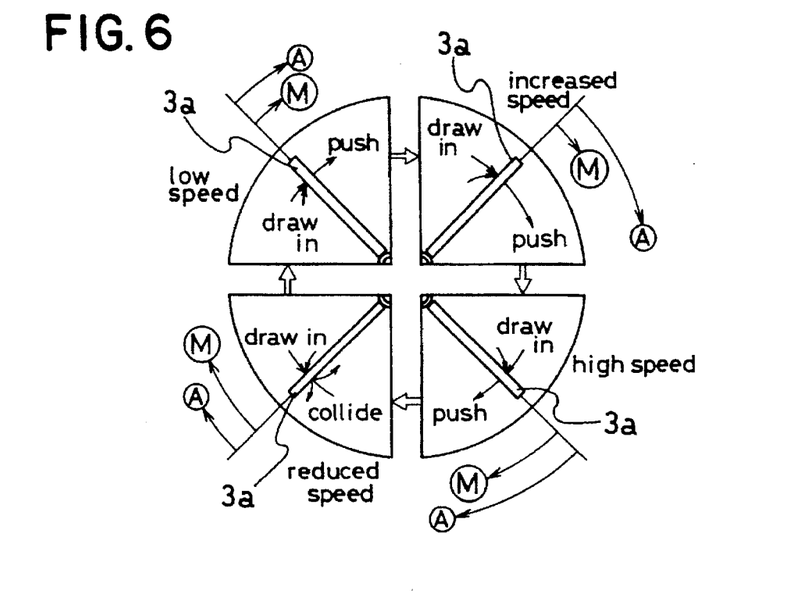
FIG. 6 is an explanatory drawing showing the force which the agitating blades exert on the materials when the agitating blades are rotated at an increased speed, a high speed, a reduced speed and a low speed.

In accordance with the rotation of the agitating blades 3, the raw materials agitate-mixed flow circularly in the container 1 as shown by arrows W in FIG. 5a, and they are also circulated by convection in the vertical direction as shown in FIG. 5b. During this time, the agitating blades 3 are rotated at a high speed and a low speed alternately in repetition. Therefore, as shown in FIG. 6, a pushing force is applied repeatedly to a mixture on the side of the front surface (on the side of rotational direction) of each blade member 3a of the agitating blade 5 when the agitating blade is rotated at high, low and increased speeds, and a tensile force when the agitating blade is rotated at a reduced speed. In the meantime, a tensile force is applied repeatedly to the mixture on the side of the rear surface of each blade member 3a of the agitating blade 3 when the agitating blade is rotated at high, low and increased speeds, and this surface of each blade member receives repeatedly an impact (brakes) of the mixture colliding with the same surface when the agitating blade is rotated at a reduced speed. Accordingly, the mixture is put in an irregular turbulent condition, and the collision and contacting of the materials are promoted, a large shearing force being imparted to the mixture. As a result, a loosening force can be exerted effectively on the mixture, and the mixture can be heated uniformly from the inner portion thereof due to the frictional heat generated by the mutual collision and contacting of the materials, whereby the reaction of the raw materials can be promoted. This enables the agitate-mixing time to be reduced, and the agitate-mixing efficiency to be improved. Moreover, it is not necessary to change the shape and size of the agitating blades in accordance with the properties of the viscous materials to be processed, and a high agitate-mixing effect can be obtained at all times. It is also unnecessary to provide a baffle plate, so that the discharging of a mixture and the cleaning of the interior of the container after the completion of a material mixing operation become easy. There is not the possibility that the raw materials placed in the container are not sufficiently mixed to cause a dead zone, in which the materials reside, to occur. This apparatus can be suitably used for all kinds of viscous materials to be processed. Furthermore, a decrease in the energy efficiency does not occur since the agitating blades 3 are rotated continuously in the same direction without being reversed.

Referring to FIG. 6, arrows A denote rotational speeds of the members 3a of the agitating blades 3, and arrows M circulating speeds of a mixture, the longer arrows indicating higher speeds.

Figures 7A, 7B, 7C:
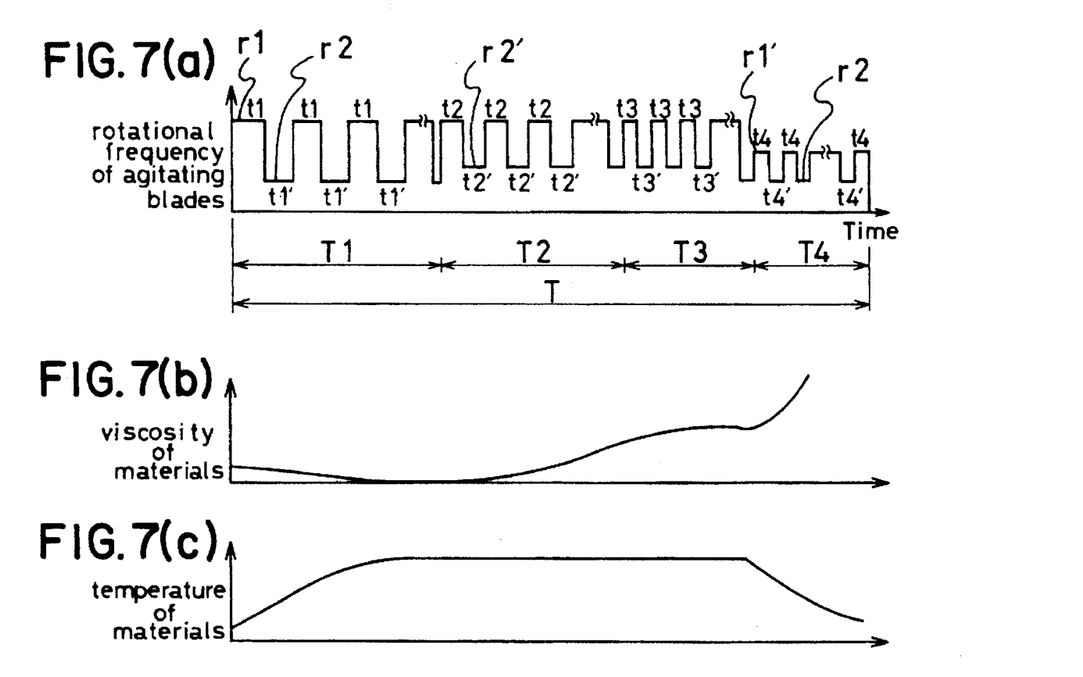

FIG. 7 shows an example in which a plurality of kinds of raw materials, i.e. polyether and isocyanate are placed in the container 1 and agitate-mixed as they are heated and cooled. The container 1 used has a heating and cooling passage in its wall. The heating steam is passed through the passage to increase the temperature of the materials to an object reaction temperature, and this temperature is thereafter maintained as the steam heating of the materials is repeated intermittently, the materials being cooled to an object temperature after the reaction has finished. The variation of the temperature of the materials mixed during this time is as shown in FIG. 7c. FIG. 7b shows the variation of viscosity of the mixture.

As shown in FIG. 7a, the agitating blades 3 are initially rotated at a predetermined high speed r1 for a period of time t1, and then at a predetermined low speed r2 for a period of time t1'. The high-speed rotation and low-speed rotation are repeated periodically in an alternate manner for a period of time T1.

The agitating blades 3 are then rotated at this high speed r1 for a reduced period of time t2, and thereafter at a low speed r2', which is higher than the low speed r2, for a period of time t2'. These rotation speeds are repeated periodically for a period of time T2. Consequently, the reaction progresses, and the viscosity, which once decreased, of the mixture increases.

The agitating blades 3 are then rotated at the high speed r1 for a further reduced period of time t3, and thereafter at the low speed r2' for a period of time t3'. These rotations are repeated for a period of time T3 until getting the mixture as a prepolymer of the object having final post-reaction property (viscosity).

When the product is cooled to an object temperature with cooling water after the completion of the reaction, it is agitated by the agitating blades 3 at a speed r1', which is lower than the high speed r1, and the low speed r2 for predetermined periods of time t4, t4' respectively in an alternate manner for a period of time T4. In this cooling step, the levels of the high and low rotational speeds are set lower, and a difference therebetween smaller, for the purpose of minimizing the generation of frictional heat which is caused by the collision of the mixture with the agitating blades 3 and the collision and contacting of the portions of the mixture.

Since the high and low rotational speeds and the duration time of these rotations are thus varied in every predetermined cyclic time T1, T2 . . . and in accordance with the progress of the reaction and the increased viscosity of the materials, the agitate-mixed condition and circulated fluidized condition of the materials which are effective for the reaction in the respective time zones can be created.

When the high and low rotational speeds and the duration of the rotations at these speeds are changed in every predetermined cycle as mentioned above, they can be selected suitably in accordance with the kind of the materials to be mixed. At least, either a high rotational speed or a low rotational speed and/or at least either one of the duration of rotations can be changed.

Figure 8:
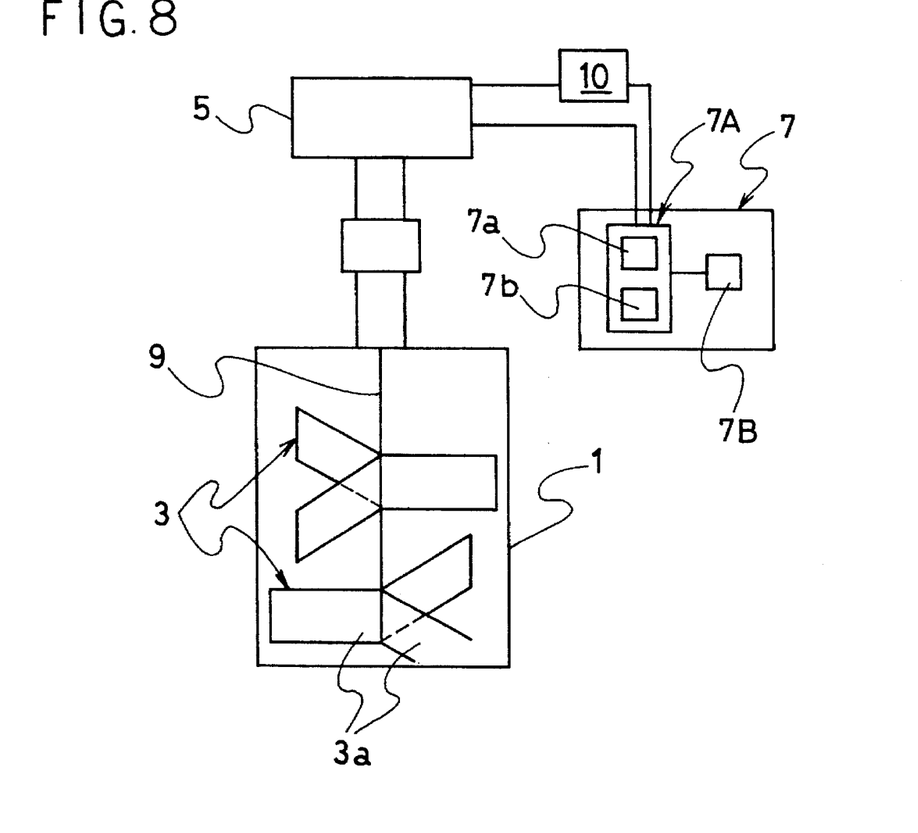
FIG. 8 is a schematic construction diagram showing another example of the raw material mixing apparatus according to the present invention.

FIG. 8 shows another mixing apparatus which has a means 10 for detecting the torque of the motor 5 in the mixing apparatus described above. The agitate-mixed condition (including the circulated fluidized condition) of the raw materials being agitate-mixed is judged on the basis of the variation of the torque of the motor 5. The torque detecting means 10 connected to the motor 5 is connected to the control unit 7, in which the controller 7A is adapted to carry out a feedback control operation on the basis of an information signal obtained in the detecting means 10, for regulating the set levels in the speed control means 7a and time control means 7b so that these levels become suitable control levels, in accordance with the agitate-mixed condition of the raw materials.

This method of judging the agitate-mixed condition of the raw materials, in which the above-mentioned torque detector for the motor 5 is used, may be changed to a method using a detector for detecting the agitate-mixing temperature of the raw materials, agitating pressure, mixing viscosity, velocity of flow of the raw materials being agitated, and amperage of the motor 5. A method having a combination of these detectors can also be used.

Figure 9:
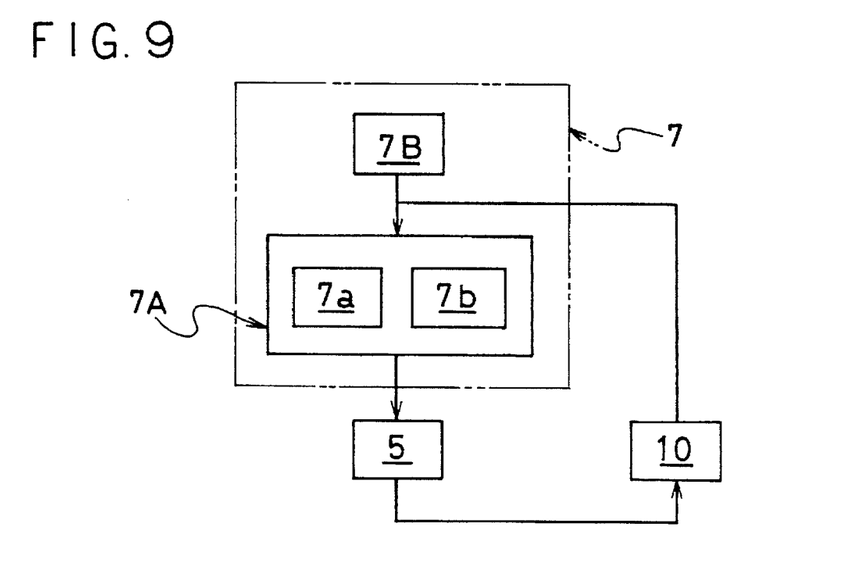
FIG. 9 is a block diagram showing the feedback controlling of the apparatus of FIG. 8.

A detected level from the torque detecting means 10 is converted into a voltage (quantitative level), and then sent to the controller 7A in the control unit 7 as shown in FIG. 9. A correction value computed in the controller 7A on the basis of the detected level is applied as a controlled variable to the speed control means 7a and time control means 7b, whereby the rotating conditions for the motor 5 is regulated, the rotation of the agitating blades 3 being thereby controlled for properly agitate-mixing the raw materials. This agitate-mixed condition of the raw materials is detected by the detecting means 10, and a feedback operation in which the set levels in the speed control means 7a and time control means 7b are corrected is carried out repeatedly.

Since the rotating condition of the agitating blades 3 is thus changed in accordance with the agitate-mixed condition of the mixture, the agitate-mixing conditions can be changed in an occasion-suited manner with respect to viscous materials, the properties of which vary during the reaction with the lapse of agitate-mixing time, in such a manner that an optimum agitate-mixed condition is attained in every part of the agitate-mixing time. Accordingly, an excellent agitate-mixing operation can be carried out.

Figure 10:
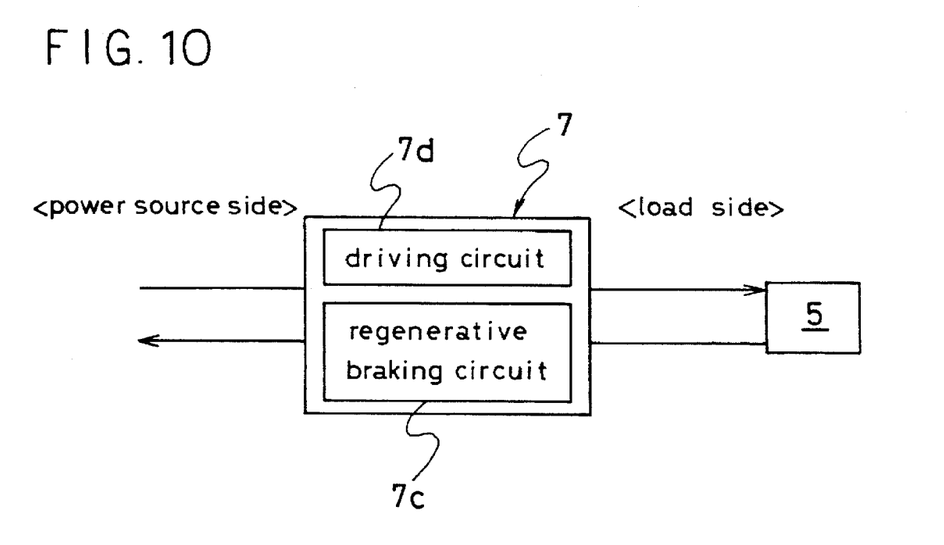
FIG. 10 is an explanatory drawing of a case where the regenerative braking is done by a motor when the rotational speed is reduced.

FIG. 10 is an explanatory drawing of this mixing apparatus adapted to have the motor 5 carry out a regenerative braking operation at the time reducing the rotational speed of the agitating blades. In this apparatus, a regenerative braking circuit 7c is provided in the control unit 7. When the rotational speed of the agitating blades 3 is reduced from a high level to a low level, a driving circuit 7d for the motor 5 is switched to the regenerative braking circuit 7c to operate the motor 5 as a generator, whereby a regenerative braking force is applied to the agitating blades 3.

Figure 11:
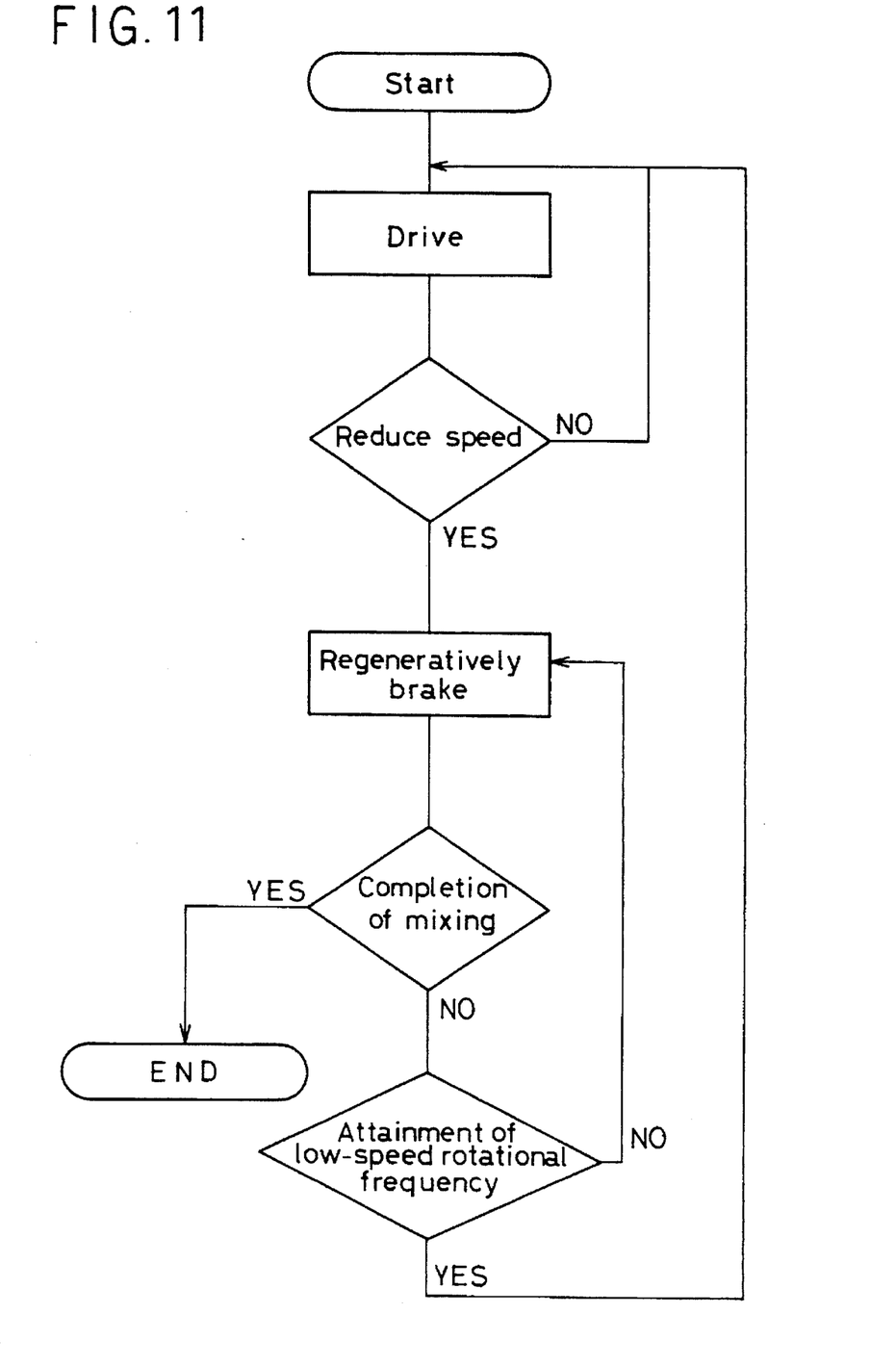
FIG. 11 is a flow chart showing the operation of a control unit during the regenerative braking done by the motor.

In the apparatus in which the regenerative braking of the agitating blades is done when the rotational speed thereof is reduced, a control operation therefor is carried out by the control unit 7 as shown in FIG. 11. First, when the apparatus starts being operated after the raw materials are placed in the container, the motor 5 is rotated via the driving circuit 7d. When the rotational speed of the motor 5 decreases from a high level to a low level, the driving circuit 7d for the motor 5 is switched to the regenerative braking circuit 7c, so that the motor 5 temporarily works as a generator due to the regenerative braking operation. During this time, a generated output is supplied to a power source side.

Whether or not the mixing of the raw materials has finished (the time of completion of the mixing thereof when the mixing time is set in advance) is then judged, and when the mixing operation continues to be carried out, whether or not the rotational speed of the agitating blades 3 has reached a predetermined low level is judged. When the rotational speed of the agitating blades 3 reaches the mentioned low level, the regenerative braking circuit 7c is switched to the driving circuit 7d, and the agitating blades 3 are rotated by the motor 5. These operations are repeated until the mixing of the materials has finished.

Since the rotational speed of the agitating blades 3 can thus be switched speedily from a high level to a low level by carrying out the regenerative braking of the agitating blades 3 when the rotational speed thereof is reduced, the flow of the mixture can be put in a turbulent condition by utilizing the agitating speed difference, whereby the effect in agitating the materials efficiently can be obtained. Moreover, the saving of energy can be done by returning the electric energy generated by the motor 5, which works as a generator when the rotational speed of the agitating blades is reduced, to the power source connected to the regenerative braking circuit 7c.

Figure 12:
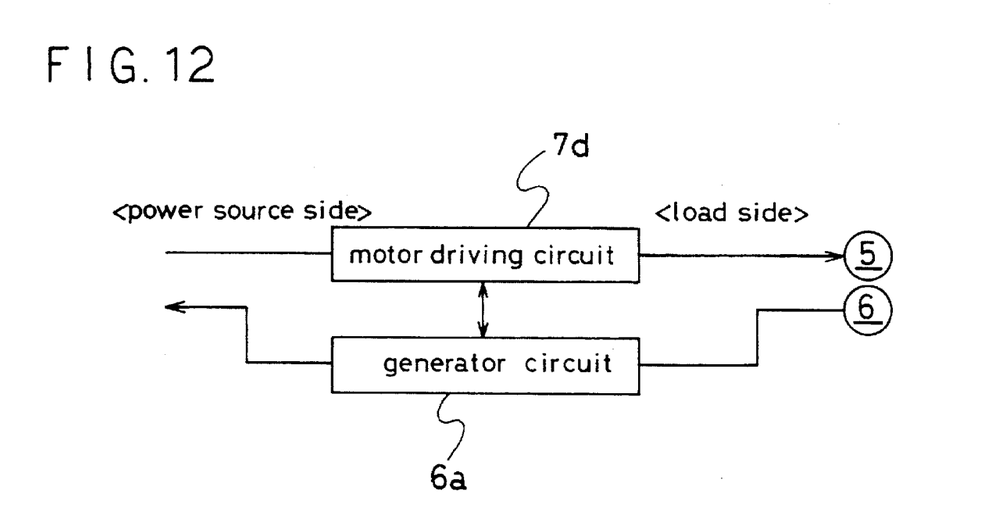
FIG. 12 is an explanatory drawing showing an example of a case where the braking is done by a generator when the rotational speed is reduced.

FIG. 12 is an explanatory drawing showing an example of a case where the braking of the agitating blades is done by a generator when the rotational speed thereof is reduced. Unlike the arrangement in the embodiment of FIG. 10, a generator 6 is provided in parallel with the motor 5. When the rotational speed of the agitating blades 3 decreases, the motor 5 is turned off, and the generator 6 on to brake the agitating blades 3. In this example, the electric energy generated by the generator 6 is supplied to the power source by turning off the driving circuit 7d and on a circuit 6a in the generator 6 by the control unit 7. Additionally providing the generator 6 in this manner also enables the same effect as mentioned above to be obtained. When a generator 6 of a higher generating efficiency is used, the braking force during the reduction of the rotational speed of the agitating blades increases, so that a greater agitating effect can be obtained.

In these embodiments of the present invention, known raw materials can be used as long as a viscous material can be obtained from a mixture thereof. For example, raw materials including a liquid, a solid, a liquid in the form of paste, and powdery bodies are used.

The present invention can be preferably used as long as it is adapted to manufacture a viscous material by agitate-mixing a plurality of kinds of raw materials of different properties, and an object viscous material is not specially limited. The present invention can be used for the production of, for example, a bonding agent.

EXAMPLES

Example A

Paste type materials of an intermediate viscosity having a fluidity and a post-agitate-mixing viscosity of 1000 poise were manufactured by the method according to the present invention and a conventional method by using a mixing apparatus shown in FIG. 1 in which agitating blades of 1160 mm in outer diameter was provided in a cylindrical container of 1200 mm in inner diameter and raw materials including liquid materials of 50% of urethane prepolymer of 50 poise and 10% of plasticizer (alkyl adipate), and a pulverized material of 40% of micro-granular filler (fatty acid-treated calcium carbonate).

In the method according to the present invention, the high-speed rotational frequency and low-speed rotational frequency were set to 75 rpm and 40 rpm respectively. First, the raw materials were agitated (for 20 minutes in total) by rotating the agitating blades at a high speed and a low speed alternately for 60 seconds each and repeating the rotations 10 times each. Another high-speed and low-speed rotations were then made alternately for 40 seconds each and repeated 10 times each (the agitation of the materials was made for 13 minutes and 40 seconds in total) to complete the mixing of the raw materials. In a conventional method, the rotational frequency was set to a constant level of 75 rpm.

The agitate-mixed condition of these materials was observed to find out the following. According to the present invention, a substance comprising mixed powder and grain remained in small quantities after the lapse of 20 minutes, and was not recognized after the lapse of 30 minutes. A paste type material of particulate of 5–10 µm measured with a grind gauge could be obtained.

On the other hand, in the conventional method, a little hard (substantially crushable by hand), uneven a substance comprising mixed powder and grain occurred in the central portion of a mixture after the lapse of 30 minutes, and decreased gradually by further agitate-mixing the product. However, after the lapse of 40 minutes, the decrease in the amount of the substance stopped to become substantially equilibrated.

Accordingly, it is understood from the above that the method according to the present invention enables the agitate-mixing time to be reduced, the level of the added pulverized material mix-dispersing power to be improved, an agitation efficiency to be improved, and a viscous material in a well-mixed state to be obtained.

Example B

An aromatic organic solvent was added to a high-viscosity paste type material (having a viscosity of 50000 Ps), and such a mixed material was agitate-mixed by the method according to the present invention and a conventional method by using the same mixing apparatus as mentioned above.

In the method according to the present invention, the high-speed rotational frequency and low-speed rotational frequency of the blades were set to 75 rpm and 50 rpm respectively. First, the raw materials were agitated (for 20 minutes in total) by rotating the agitating blades at a high speed and a low speed alternately for 60 seconds each and repeating the rotations 10 times each. Another high-speed and low-speed rotations were then made alternately for 60 seconds each and repeated 5 times each (for 10 minutes in total) to complete the mixing of the raw materials. In a conventional method, the rotational frequency was set to a constant level of 75 rpm.

The agitate-mixed condition of these materials was observed to find out the following. In the conventional method, mixing materials in another which have great viscosity differences as mentioned above caused an interface to be formed temporarily between the materials due to the additive, and, when a slip started, idle running continued for a considerably long period of time until the materials started being mixed again. Therefore, 50 minutes were needed to complete the mixing operation. In the method according to the present invention, the time in which the idle running continued was short, and 30 minutes were required to complete the mixing operation.

As described above, in the method according to the present invention, the raw materials are mixed as the rotational speed of the agitating blades is cyclically switched between a high level and a low level. Accordingly, the agitating blades repeatedly exert at their front surfaces with respect to the rotational direction thereof a pushing force and a tensile force repeatedly on the raw materials which the agitating blades contact, and repeatedly exert at their rear surfaces with respect to the mentioned direction a tensile force and a pushing force when the materials collide therewith. This enables a loosening force and a mixing force to be applied effectively to the materials being agitate-mixed, the agitate-mixing time for homogenizing a mixed viscous material to be thereby reduced, and the agitate-mixing efficiency to be improved. Even when the properties of the viscous materials to be processed are different, a large agitate-mixing effect can be obtained without changing the shape and size of the agitating blades and without providing baffle plates. Moreover, since the agitating blades are rotated in the same direction at all times during a mixing operation, the energy efficiency does not decrease.

What is claimed is:

1. A raw material mixing method of the batch type comprising the steps of placing a plurality of kinds of raw materials of different properties in a cylindrical container having rotating agitating blades, rotating the blades to agitate mix said raw materials to obtain a viscous product therefrom, cyclically switching the rotational speed of said agitating blades during said rotation between a high-speed rotation and a low-speed rotation and changing the durations of at least one of said high-speed rotations and said low-speed rotations of said agitating blades at a predetermined cycle.

2. The raw material mixing method of claim 1, including changing the rotational speed of at least one of said high-speed rotations and said low-speed rotations of said agitating blades at a predetermined cycle.

3. The raw material mixing method of claim 1, including detecting a condition of said raw materials being agitate-mixed by said agitating blades during said rotation and regulating the speeds and durations of said high-speed rotations and said low-speed rotations of said agitating blades according to the condition detected.

4. The raw material mixing method of claim 1, wherein said agitating blades are rotated by a motor, the reduction of the rotational speed of said agitating blades from a high-speed rotation to a low-speed rotation being carried out by applying a regenerative braking force to said motor to reduce the rotational speed of the motor and thereby the rotational speed of the blades.

5. The raw material mixing method of claim 1, wherein said agitating blades are rotated at the same speed during each high speed rotation.

6. The raw material mixing method of claim 1, wherein said agitating blades are rotated at the same speed during each low speed rotation.

7. The raw material mixing method of claim 1, wherein the durations of said high-speed rotations and the durations of said low-speed rotations of said agitating blades are changed periodically.

8. The raw material mixing method of claim 1, wherein said raw materials react to form said viscous product, the method including the steps of heating the raw materials in the cylindrical container to a reaction temperature, after said reaction temperature is reached maintaining the materials at said temperature and after said reaction is completed and the viscous product obtained, cooling said viscous product in said container.

9. The raw material mixing method of claim 8, wherein during said cooling of the, viscous product, the rotational speed of said high-speed rotations is lowered from the rotational speed of said high-speed rotations before the reaction is completed to reduce the difference between the rotational speed of the high-speed rotations and the rotational speed of the low-speed rotations.

10. The raw material mixing method of claim 2, wherein the rotational speeds of said high-speed rotations and the rotational speeds of said low-speed rotations of said agitating blades are changed periodically.

11. A raw material mixing method of the batch type comprising the steps of placing a plurality of kinds of raw materials of different properties in a cylindrical container having rotating agitating blades, rotating the blades to agitate mix said raw materials to obtain a viscous product therefrom, and cyclically switching the rotational speed of said agitating blades during said rotation between a high-speed rotation and a low-speed rotation, said agitating blades being rotated by a motor with the reduction of the rotational speed of said agitating blades from a high-speed rotation to a low-speed rotation being carried out by applying a regenerative braking force to said motor to reduce the rotational speed of the motor and thereby the rotational speed of the agitating blades.

12. A raw material mixing apparatus of the batch type for obtaining a viscous product by agitate-mixing a plurality of kinds of raw materials of different properties, said apparatus comprising a cylindrical container for holding said raw materials, agitating blades rotatably mounted in said cylindrical container for agitating said raw materials therein during their rotation to obtain the viscous product, driving means for rotating said agitating blades, and a control unit having speed control means for controlling the speed of said driving means to cyclically switch the rotational speed of said agitating blades between a high-speed rotation and a low-speed rotation and time control means for controlling the durations of said high-speed rotations and the duration is of said low-speed rotations of said agitating blades, the time control means changing the durations of at least one of said high-speed rotations and said low-speed rotations of said agitating blades at a predetermined cycle.

13. The raw material mixing apparatus of claim 12, wherein said speed control means and said time control means are controlled by predetermined control data.

14. The raw material mixing apparatus of claim 13, including detecting means for detecting the condition of the agitate mix of raw materials and generating information signals, said speed control means and said time control means regulating the speeds and durations of said high-speed rotation and said low-speed rotations of said agitating blades according to the information signals received from said detecting means and the predetermined control data.

15. The raw material mixing apparatus of claim 12, wherein said driving means is a motor, and including means for applying a regenerative braking force to said motor to reduce the rotational speed of said agitating blades when reducing the rotational speed of the blades from a high-speed rotation to a low-speed rotation.

16. The raw material mixing apparatus of claim 12, wherein said driving means is a motor, and including a generator rotatably connected in parallel with said motor to the agitating blades, and switching means for switching said connection from said motor to said generator to brake the rotational speed of said agitating blades when reducing the rotational speed of the agitating blades from a high-speed rotation to a low-speed rotation.

17. The raw material mixing apparatus of claim 12, wherein the speed control means periodically changes at least one of the rotational speeds of said high-speed rotations and the rotational speeds of said low-speed rotations.

18. The raw material mixing apparatus of claim 17, wherein the speed control means periodically changes both the rotational speeds of said high-speed rotations and the rotational speeds of said low-speed rotations of said agitating blades.

19. The raw material mixing apparatus of claim 12, where the speed control means rotates the agitating blades at the same speed during each high-speed rotation and at the same speed during each low-speed rotation.

20. The raw material mixing apparatus of claim 12, wherein the time control means periodically changes both the durations of the high-speed rotations and the durations of said low-speed rotations of said agitating blades.

21. The raw material mixing apparatus of claim 12, wherein said cylindrical container includes fluid passage means for passing heating steam or cooling water through said container.

22. A raw material mixing apparatus of the batch type for obtaining a viscous product by agitate-mixing a plurality of kinds of raw materials of different properties, said apparatus comprising a cylindrical container for holding said raw materials therein, agitating blades rotatably mounted in said cylindrical container for agitating said raw materials, a motor for rotating said agitating blades, a control unit for controlling the rotational speed of the motor to cyclically switch the rotational speed of said agitating blades between a high-speed rotation and a low-speed rotation, and means for applying a regenerative braking force to said motor to reduce the rotational speed of the motor and thereby the rotational speed of the agitating blades when reducing the rotational speed of the agitating blades from a high-speed rotation to a low-speed rotation.

23. A raw material mixing apparatus of the batch type for obtaining a viscous product: by agitate-mixing a plurality of kinds of raw materials of different properties, said apparatus comprising a cylindrical container for holding said raw materials therein, agitating blades rotatably mounted in said cylindrical container for agitating said raw materials, a motor connected to the agitating blades for rotating said agitating blades, a control unit for controlling the rotational speed of the motor to cyclically switch the rotational speed of said agitating blades between a high-speed rotation and a low-speed rotation, a generator rotatably connected to the agitating blades in parallel with the motor and switching means for switching said connection from said motor to said generator to brake the rotational speed of said agitating blades when reducing the rotational speed of said blades from a high-speed rotation to a low-speed rotation.

* * * * *